United States Patent
Greuter et al.

[19]

[11] Patent Number: 6,017,023
[45] Date of Patent: Jan. 25, 2000

[54] HEIGHT-REGULATABLE HYDROPNEUMATIC SUSPENSION

[75] Inventors: Adolph Greuter, Tägerwilen; Bernhard Doll, Siegershausen; Romano Lorini, Flawil; Jens Schroeder, Konstanz; Franz Osterwalder, Kreuzlingen, all of Switzerland

[73] Assignee: Mowag Motorwagenfabrik AG, Switzerland

[21] Appl. No.: 08/912,192

[22] Filed: Aug. 18, 1997

Related U.S. Application Data

[63] Continuation of application No. PCT/EP96/00698, Feb. 20, 1996.

[30] Foreign Application Priority Data

Feb. 20, 1995 [DE] Germany .......................... 195 05 712

[51] Int. Cl.⁷ ........................................................ F16F 5/00
[52] U.S. Cl. ..................................... 267/64.11; 280/6.157
[58] Field of Search .............................. 267/64.11, 64.19, 267/64.16, 186, 64.25, 64.15, 64.18, 64.28, 218; 280/6.157, 124.106, 124.159, 6.159, 124.156, 124.158

[56] References Cited

U.S. PATENT DOCUMENTS

| | | | |
|---|---|---|---|
| 2,887,324 | 5/1959 | Jackson . | |
| 2,926,023 | 2/1960 | Kraus . | |
| 4,295,660 | 10/1981 | Toti et al. | 280/5.507 |
| 4,371,182 | 2/1983 | Brown | 280/6.16 |
| 4,872,702 | 10/1989 | Medley . | |
| 4,898,257 | 2/1990 | Brandstadter . | |
| 4,993,744 | 2/1991 | Hiromoto et al. | 280/5.51 |
| 5,619,413 | 4/1997 | Oakley | 701/37 |
| 5,678,846 | 10/1997 | Davis | 280/124.157 |
| 5,785,344 | 7/1998 | Vandewal et al. | 280/64.16 |

FOREIGN PATENT DOCUMENTS

| | | |
|---|---|---|
| 385618 | 9/1990 | European Pat. Off. . |
| 949761 | 9/1949 | France . |
| 1157940 | 11/1963 | Germany . |
| 1902918 | 8/1970 | Germany . |
| 2604809 | 8/1977 | Germany . |
| 3528829 | 12/1986 | Germany . |
| 59048211 | 3/1984 | Japan . |
| 3005223 | 1/1991 | Japan . |
| 3262720 | 11/1991 | Japan . |
| 5254430 | 10/1993 | Japan . |
| 1505802 | 9/1989 | U.S.S.R. . |

*Primary Examiner*—Robert J. Oberleitner
*Assistant Examiner*—Melanie Talavera
*Attorney, Agent, or Firm*—Laubscher & Laubscher

[57] ABSTRACT

The invention concerns a method and apparatus for regulating the distance between the frame and a wheel unit or axle of a motor vehicle by means of a hydrodynamic suspension element by varying the volume of the damping liquid. The vehicle frame is sprung and damped at both sides of the vehicle relative to one or more wheel axles by means of hydropneumatic springs, wherein one of the volumes of the hydropneumatic springs is variable. In this arrangement, to increase the distance the static volume is supplemented by an additonal volume and to reduce the distance the static volume is reduced by a reduction volume. Associated with one or more parallel-connected hydropneumatic springs is a metering unit which can add or withdraw at least one defined additional volume and/or reduction volume with respect to the instantaneous sum of the damping volumes of the associated hydropneumatic springs. The vehicle frame/wheel axle distance can be adjusted in the region of the hydropneumatic springs connected to the metering unit by detecting the condition of the metering unit by means of sensors arranged on the metering unit and readjusting to the reference functional condition.

15 Claims, 3 Drawing Sheets

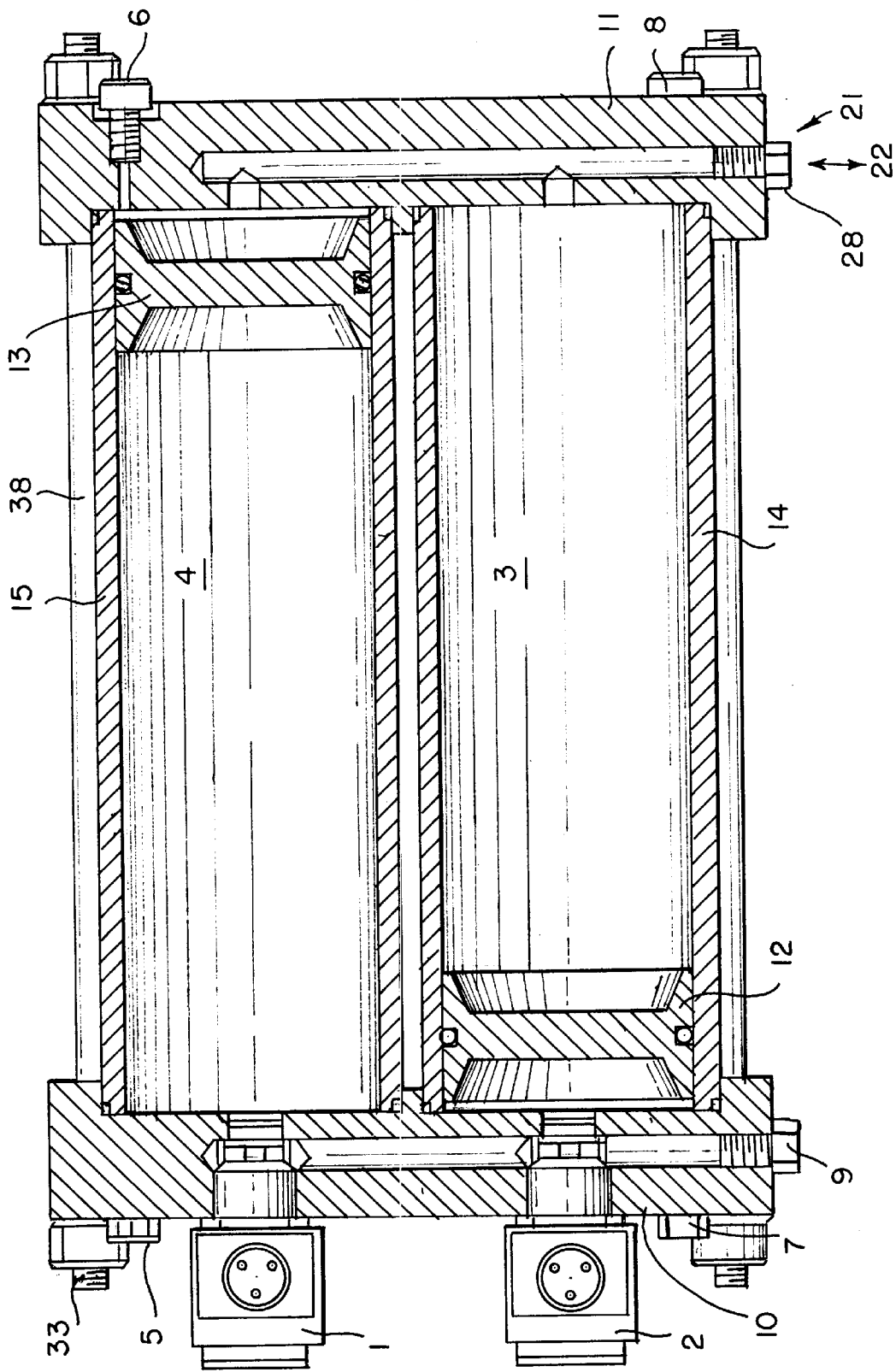

HEIGHT-REGULATABLE HYDROPNEUMATIC SUSPENSION

This application is a continuation of PCT/EP 96/00698 filed Feb. 20, 1996.

BACKGROUND OF THE INVENTION

The present invention relates to a method and apparatus for regulating the distance between the frame and a wheel or axle of a vehicle by means of a hydropneumatic suspension system arranged therebetween.

BRIEF DESCRIPTION OF THE PRIOR ART

Hydropneumatic suspension systems generally comprise a gas volume and a liquid volume which are arranged in a housing and separated by a piston. In such an arrangement, the housing which surrounds the liquid volume can be collapsed, whereby the amount of space available for the liquid volume is reduced. Of the two parts of the housing which are movable relative to each other, one part is connected with the frame of the vehicle and the other part is connected with the axle or wheel unit. In addition, the liquid volume is subdivided into two sub-volumes by an internal throttle.

When the two-part fixed housing which surrounds the liquid volume is collapsed, the separating piston is shifted in a direction towards the adjoining gas volume, whereby the gas volume is reduced and the gas contained therein is compressed. The compressed gas volume performs the springing suspension function and the liquid volume, by virtue of the internal throttle, performs a damping function.

The greater the contained volume of damping liquid, the greater is the change in the distance produced by the hydropneumatic spring between the frame and the axle of the vehicle. The assembly is otherwise unchanged, particularly with respect to the dimensions of the housing surrounding the damping liquids.

SUMMARY OF THE INVENTION

Accordingly, it is a primary object of the invention to provide a simple method and apparatus for increasing or reducing the distance relative to a normal static position of a vehicle frame with respect to the axles of the vehicle. The distance can be altered independently for the front, rear, and sides of the vehicle, and the functional elements of the hydropneumatic system are protected from damage.

The hydropneumatic suspension system includes at least one hydropneumatic spring connected between an axle and the vehicle frame. The spring includes a variable damping fluid volume. A pair of parallel connected metering cylinders is connected with the spring. Each cylinder includes a reciprocating piston for subdividing the cylinder into two volumes. One of the cylinders includes a working volume and an addition volume and the other cylinder includes a working volume and a reduction volume. The addition and reduction volumes are connected with the damping volume of the spring. By controlling the operation of the metering cylinders, fluid can be added to or withdrawn from the damping volume of the spring to raise or lower the vehicle frame from a normal, static position relative to the axle.

Starting from the normal, static or central position, the distance between the frame and the axle can be increased or reduced by a defined amount. The configuration affords a very simple structural design and also a very simple control so that even in the event of purely manual actuation in an emergency situation, it is still possible for the different sides of the vehicle or the front and the rear of the vehicle to be displaced separately. The fact that an additional volume of liquid is added to the static volume or a reduction volume is withdrawn therefrom makes it possible to achieve a structural configuration without pressure-dependent sensors.

While in the normal case, a vehicle of this kind will have a control system which uses sensors at regular intervals to check the actual condition of the individual hydropneumatic springs for conformity with a reference condition which is set by way of a control lever, in the event of failure of the control components and the sensors, it is still possible for the vehicle to be purely manually controlled. This is important in particular in the case of vehicles involved in military uses in which the other advantages of a high position or a low position of the vehicle relative to the normal position are particularly significant.

For example, when the vehicle is raised, it has improved mobility and capacity for passing over obstacles. Deliberate inclined positioning of the vehicle frame in the longitudinal or transverse direction in order to increase the elevation or depression of a weapons system mounted thereon may also be achieved. When the vehicle is lowered, the lower overall height of the vehicle is advantageous for travelling beneath objects, for air transportability of the vehicle, for better camouflage as a result of the lower silhouette, for better on-road positioning when travelling on roads and freeways, and greater ease of operation when loading and unloading and greater ease of maintenance.

The use of two parallel-connected metering cylinders which communicate on the one hand with the vehicle hydraulic system and on the other hand with the connected hydropneumatic springs makes it possible to set three different height positions, irrespective of the instantaneous inclined positioning of the vehicle, the loading thereof and similar variable factors. For actuation purposes, all that is required is a directional control valve, preferably an electromagnetically operated valve unit, which selectively applies the pressure of the vehicle hydraulics to both, one or neither of the two metering cylinders.

As a result, the vehicle hydraulic system is separate from the suspension hydraulic system of the hydropneumatic springs. Since only the hydropneumatic springs themselves have to be arranged directly at the wheel units or axles, all other functional parts, including the metering cylinders of the metering units, can be arranged within the body structure of the vehicle and thus protected from damage which is advantageous for military vehicles. The internal vehicle hydraulic system thus remains fully operational in the event of damage to the hydropneumatic springs.

The pistons in the metering cylinders reciprocate between two limit positions in the longitudinal direction and separate the damping liquid used in the hydropneumatic springs from the hydraulic medium of the vehicle hydraulic system. The pistons are monitored by suitable sensors, preferably inductive pick-ups, which are mounted directly on the metering cylinders to indicate when the pistons reach their limit positions. The sensors indicate to the driver via optical display elements when the preselected reference or target position of the metering units are attained. By actuation of a suitable electrical control, the sensors also permit detecting the actual position at predetermined intervals of time and re-adjustment if required.

If a metering cylinder which is put under pressure for maintenance of its reference position were permanently hydraulically connected with the vehicle hydraulic system, then the length of the connection lines involved could result in oscillations in that column of fluid, and those oscillations would result in undesired reactions in the metering cylinders and the hydropneumatic springs and would thus also result in undesired display results from the sensors mounted on the metering cylinders. In order to avoid this problem, communication between the vehicle hydraulics and the metering unit is separable by way of a shut-off valve arranged as close to the metering unit as possible. After the set reference condition is achieved, i.e. when the separating pistons have reached the desired limit positions in the metering cylinders, the shut-off valves are closed and are only opened when re-adjustment is necessary as a result of a change in the actual position of the separating pistons, or if the driver sets a new reference position. Monitoring to ensure that the actual position is being maintained is performed by an electrical control at fixed intervals of time. The electromagnetic valve unit could be combined with the shut-off valves if the electromagnetic valve unit were disposed directly at the metering unit and were to have an additional shut-off position for both metering cylinders. However, this would prevent all of the electromagnetic valve units of a vehicle from being combined together in a central valve unit.

After a new reference position is entered, the shut-off valves do not close after a given period of time. Rather, they close when the corresponding sensors detect that the separating pistons have reached the reference positions. Under some circumstances, such as when travelling cross-country, one wheel unit is subject to a heavy load as a result of the instantaneous situation in regard to the terrain being traversed, and thus the pressure level in the corresponding hydropneumatic spring is momentarily higher than the working pressure of the vehicle hydraulic system. In that case displacement of the separating pistons by means of the vehicle hydraulic system into the desired position is only possible after the pressure in the hydropneumatic spring connected therewith has fallen beneath the working pressure of the vehicle hydraulic system.

Preferably, the shut-off valves are biased into the open position by means of a spring, the force of which must be overcome by a suitable electromagnetic valve directed in opposite relationship thereto, in order to effectively maintain displacement of the vehicle frame, even in the event of a power failure. The electromagnetic value unit is also biased into the static central position by means of a spring.

A preferred configuration is provided if the two metering cylinders are combined to form a metering unit, either in mutual alignment or in parallel juxtaposed relationship. In the latter case, a very compact metering unit consisting of few individual components is provided. Two identical metering cylinders are closed at their respective ends by way of common head portions which engage over both metering cylinders. One head portion has a connection to the vehicle hydraulic system and the shut-off valves for the respective metering cylinder are screwed into that head portion from the outside. This provides a fluid column of minimum length between the shut-off valve and the metering cylinder.

The other head portion includes a bore which communicates with the two metering cylinders and with the damping volumes of the associated spring. The metering cylinders are connected together in a parallel circuit arrangement.

The sensors for sensing attainment of the limit positions of the separating pistons in the individual metering cylinders are pressure-resistant sensing devices. For example, inductive sensors or pick-ups can be screwed into suitable bores extending in the longitudinal direction of the metering cylinders. The sensing members of such sensors project into the end of the working spaces in the metering cylinders to such an extent that, when a separating piston bears against the end, the sensing members are actuated thereby.

The two head portions may project radially beyond the two metering cylinders and may be braced to each other in the longitudinal direction by way of tie anchors to provide a metering unit that is of a simple structure and easy to seal.

BRIEF DESCRIPTION OF THE FIGURES

Other objects and advantages of the invention will become apparent from a study of the following specification when viewed in the light of the accompanying drawing, in which:

FIG. 3 is a sectional view of an alternate embodiment of a metering unit according to the invention.

DETAILED DESCRIPTION

Figure 1:
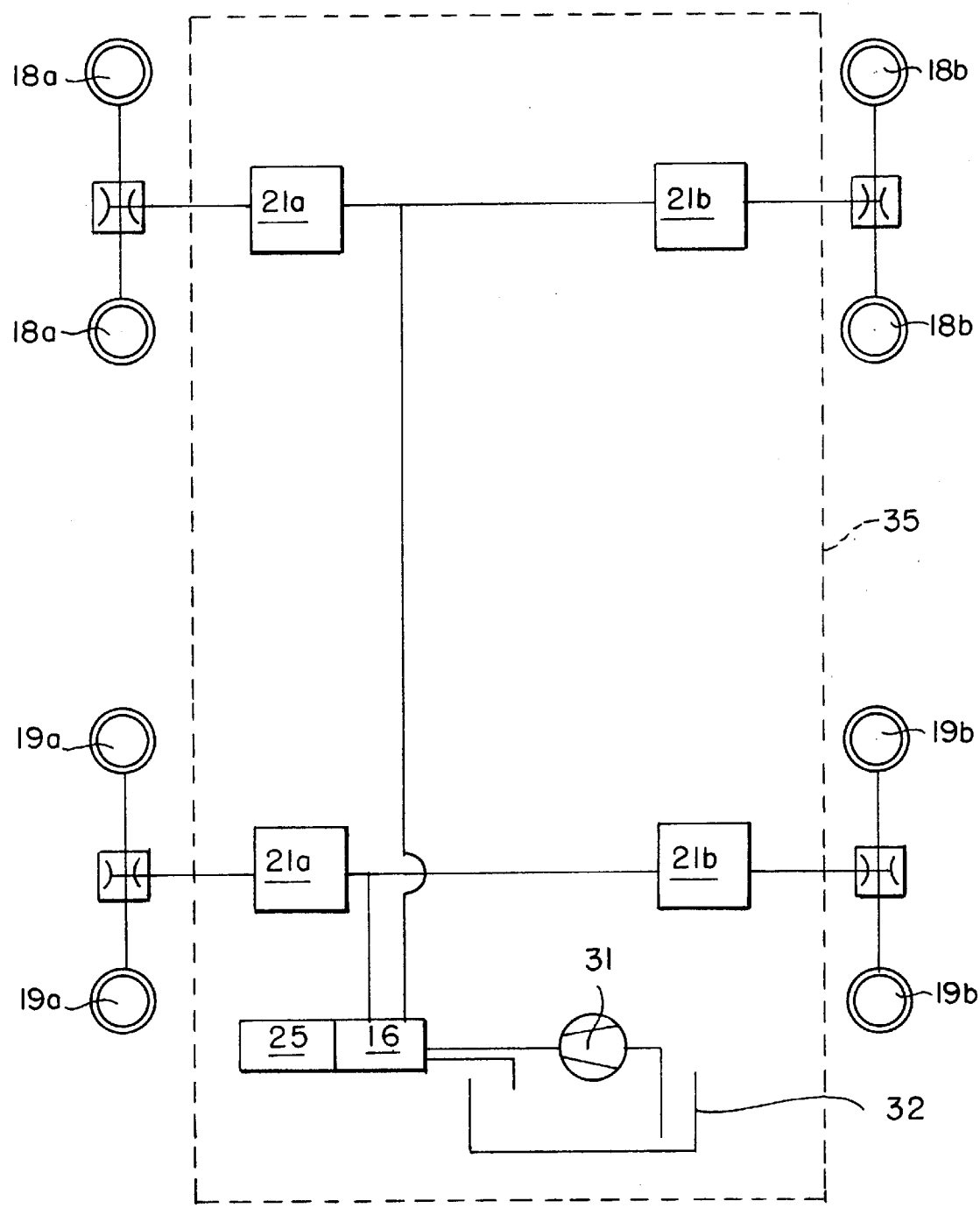
FIGS. 1 and 2 are top and front schematic views, respectively, showing a vehicle equipped with a hydropneumatic suspension system according to the invention.

Referring first to FIG. 1, there is shown a vehicle such as an armored vehicle equipped with a total of eight hydropneumatic springs 18*a*, 18*b*, 19*a*, and 19*b* which are height adjustable in accordance with the invention. In this arrangement each hydropneumatic spring is connected between a vehicle frame and a separate axle, or each pair of hydropneumatic springs 18*a*, 18*b*; 19*a*, 19*b* and so forth may always jointly support a wheel unit or an end of an axle.

Each pair of hydropneumatic springs 18*a*, 18*b*; 19*a*, 19*b* is connected in parallel and in liquid communication with a respective metering unit 21*a*, 21*b*. Each pair of metering units 21*a*, 21*b* is jointly connected with an electromagnetic valve unit 16 so that the respective left and right metering units 21*a*, 21*b* of the front of the vehicle and of the rear of the vehicle can only be commonly adjusted in respect of height. This permits a variation in the height either for the entire vehicle frame or separately for the front of the vehicle frame and the rear of the vehicle frame. If in addition the two sides of the vehicles are to be separately height adjustable, each of the metering units 21*a*, 21*b* must have a separate electromagnetic value unit associated therewith.

In the construction shown in FIG. 1, the electromagnetic valve unit 16 is supplied with working pressure by the pump 31 of the vehicle hydraulic system. The vehicle hydraulic system is an open system in which hydraulic liquid is discharged into the tank 32 and the pump 31 also draws liquid therefrom.

Figure 2:
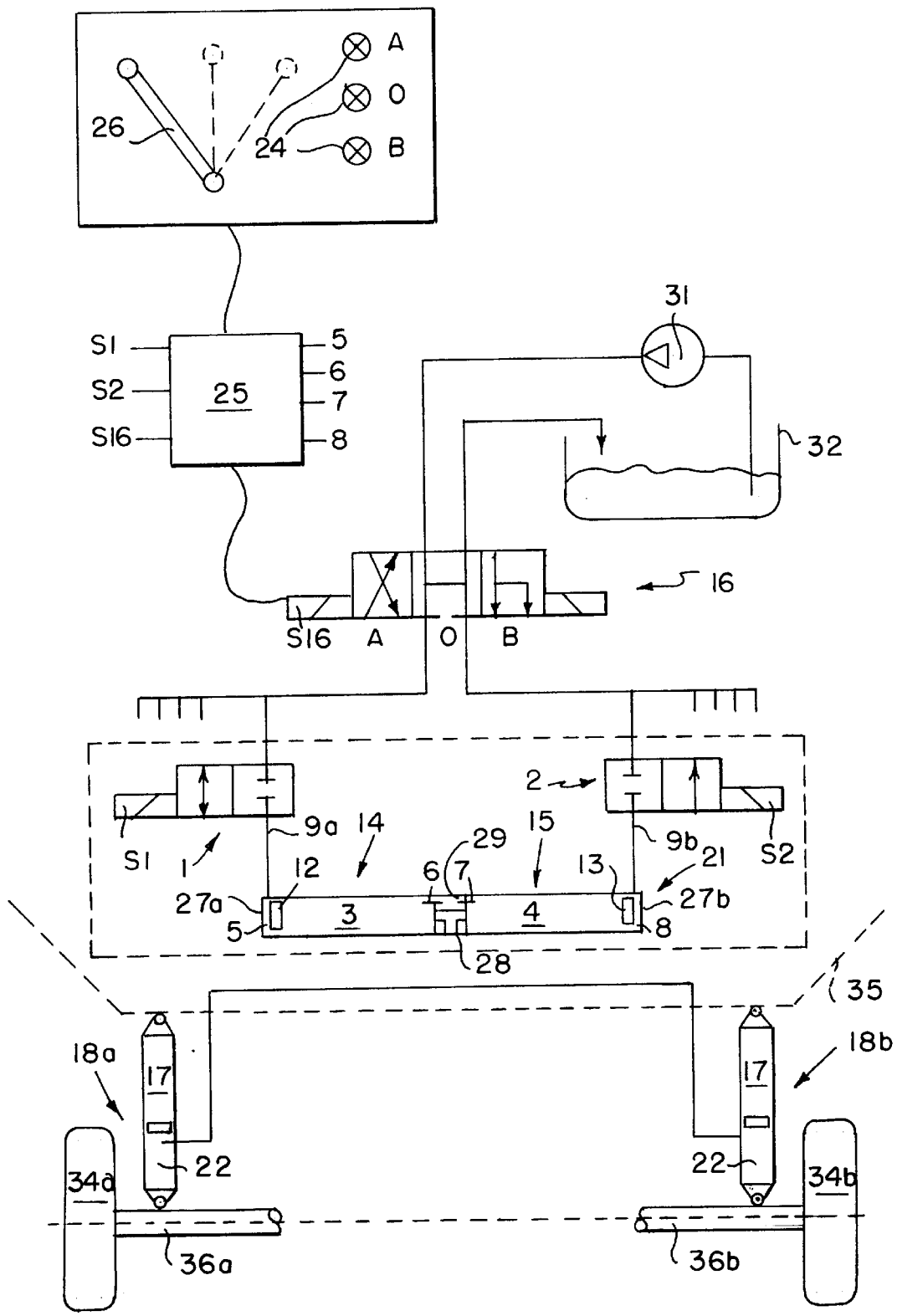

Referring now to FIG. 2, the hydropneumatic springs 18*a*, 18*b*, which are mounted between the axle ends 36*a*, 36*b* and the frame 35, are arranged exteriorly of the vehicle frame 35 while all of the other functional elements are disposed in a protected position above the frame 35 which may comprise, for example, an armored body structure. The hydropneumatic springs 18*a*, 18*b* and the associated axle ends 36*a*, 36*b* and wheels 34*a*, 34*b* may be disposed at the two ends of the same axle or on the same side of the vehicle, in relation to adjacent axles or wheel units.

Each spring 18*a*, 18*b* includes a damping volume 22 filled with a damping liquid and a gas volume 17 separate from the damping volume. The damping volumes 22 of the springs 18*a*, 18*b* are connected in parallel and communicate with each other and with the metering unit 21 via a connection 28.

In the embodiment of FIG. 2, the metering unit 21 comprises two metering cylinders 14, 15 which are arranged in an aligned relationship and which are separated by a fixed center plate 29. Each cylinder has a piston 12, 13 arranged therein which reciprocates between two limit positions. The piston 12 divides the cylinder 14 into a working volume 27a and an addition volume 3. The piston 13 divides the cylinder 15 into a working volume 27b and a reduction volume 4. The addition and reduction volumes 3, 4 are constant and communicate with the cylinder damping volume 22 via the connection 28. The working volumes 27a, 27b communicate with the vehicle hydraulic system via connections 9a, 9b, shut-off valves 1, 2, and electromagnetic valve unit 16.

The valve 16 has three positions A, O, and B. Position A is the static or reference position wherein fluid is delivered only to the working volume 27b in the metering cylinder 15. Position O is the lowered position wherein no pressure is applied to the cylinders. Position B is the raised position wherein fluid pressure is delivered to both working volumes 27a, 27b.

In operation, with respect to the static or reference position A, when the valve 16 is switched to the position O, the reduction volume is withdrawn from the combined damper volumes 22 since pressure is removed from the working volume 27b of the lowering cylinder 15. The reduction volume from the damper volumes thus fills the reduction volume 4 of the lowering cylinder. With the reduction volume withdrawn from the damper volumes, the associated hydropneumatic springs are lowered. When the valve 16 is switched to the position B from the static or reference position A, the additional volume 3 is supplied to the combined damper volumes 22 from the raising cylinder 14 to raise the associated hydropneumatic springs.

Shut-off valves 1, 2 are connected with the metering unit 21 and interposed in the fluid line between the electromagnetic valve unit 16 and the working volumes 27a, 27b of the cylinders. The shut-off valves 1, 2 can be switched from the closed position into the through-flow position by means of electromagnetic switches S1 and S2. It is only when there is a change in the way in which one of the working volumes 27a, 27b is acted upon that the associated shut-off valve 1, 2 is switched over to the through-flow position. Otherwise it is held closed in order to insure that the metering unit 21 is hydraulically decoupled from the vehicle hydraulics. This prevents any fluid oscillations which may occur in the vehicle hydraulic system from being transmitted to the metering unit 21 and thus resulting in irritation of the sensors 5, 6, 7, and 8. The shut-off valves 1, 2 are biased into the closed position by springs. Parallel connections for further functional units formed of a metering unit and shut-off valves may be provided between the electromagnetic valve unit 16 and the functional unit. The sensors 5, 6, 7, 8 are arranged in the metering cylinders 14, 15 at the ends of the interiors of the metering cylinders 14, 15 and resister whether the separating pistons 12, 13 are in one limit position or the other.

The reference or target position of the system is set by way of the spool of the electromagnetic valve unit 16. A control lever 26 at the driving location of the vehicle is used to select the three shift positions A, O and B. In comparison with the reference position, the actual position is represented by display elements 24 such as light displays for the three shift conditions A, O and B. The control lever 26 could be directly mechanically connected to the spool of the electromagnetic valve unit 16. Preferably, however, the electromagnetic valve unit 16 is electrically connected to the control lever 26 via a control device 25. The control device is electrically connected on the one hand to the sensors 5 through 8 and on the other hand to the switches S1, S2 and S16 of the valves involved.

It is thus possible for the control, by way of a suitable program, to compare the detected actual position of the sensors 5 through 8 to the predetermined reference position at predetermined time intervals and to provide for re-adjustment in the event of a deviation, after opening of the shut-off valves 1, 2.

FIG. 3 is a sectional view of an alternative configuration of a metering unit 21 in which the two metering cylinders 14, 15 are not arranged in alignment but in parallel juxtaposed relationship. The two metering cylinders 14, 15 comprise tubular portions which are closed at their ends with respective head portions 10, 11 extending over both metering cylinders 14, 15, and by means of ring seals. In that arrangement the head portions 10, 11 are braced relative to each other by means of tie anchors 33 extending outside the metering cylinders. Separating pistons 12, 13 reciprocate in each of the metering cylinders, respectively, and in the limit positions thereof bears against a respective one of the head portions 10, 11.

Attainment of the limit position is registered for each separating piston 12, 13 by sensors 5, 7 and 6, 8 which are screwed into the respective head portions 10, 11 in the axial direction. The respective sensing member of each sensor extends at the end into the respective metering cylinder 14, 15 and is actuated when the separating piston 12, 13 bears against the inside of one of the head portions 10, 11.

The metering pistons 14, 15 are displaced by the working pressure of the vehicle hydraulic system from the left-hand end in FIG. 3, by way of the connection 9. Before reaching the metering cylinders 14, 15, the hydraulic medium must pass the shut-off valves 1, 2 which are also screwed into the head portion 10 at the end in relation to the metering cylinders 14 and 15, respectively, and by way of which the flow to the two metering cylinders 14, 15 can be separately shut off.

FIG. 3 shows the metering unit 21 in the position A of the electromagnetic valve unit 16 in FIG. 2, that is to say in the static position. In that case the reduction volume 4 of the lowering metering cylinder 15 is not withdrawn from the damper volume 22 and the additional volume 3 from the raising metering cylinder 14 is not introduced into the damping volume 22 of the hydropneumatic springs.

The damping volume 22 is communicated by way of the connection 28 in the head portion 11 of the metering unit 21 at the right in FIG. 3 by way of suitable bores within both metering cylinders 14, 15 so that damping liquid as is used in the hydropneumatic springs is at the right of the separating pistons 12, 13 in FIG. 3 and hydraulic liquid from the vehicle hydraulic system is to the left of the separating pistons 12, 13.

What is claimed is:

1. A method for regulating the distance between the frame and at least one axle of a vehicle by adjusting a hydropneumatic suspension element from a static position, comprising the steps of
   (a) actuating a first metering cylinder to introduce an additional volume of damping liquid into the hydropneumatic suspension element to increase the distance between the vehicle frame and the axle; and
   (b) actuating a second metering cylinder to withdraw a reduction volume of damping liquid from the hydropneumatic suspension element to reduce the distance between the vehicle frame and the axle, said first and second metering cylinders being mutually independently actuable.

2. A method as defined in claim 1, wherein said additional and reduction volumes are fixed.

3. A hydropneumatic suspension system for regulating the distance between the frame and at least one axle of a vehicle, comprising
   (a) at least one hydropneumatic spring connected between an axle and the vehicle frame, said spring having a variable damping fluid volume;
   (b) metering means connected with said at least one spring for adding and withdrawing a defined volume of fluid with respect to said damping volume to increase and decrease the distance between the frame and axle, respectively; said metering means comprising
     (1) first and second metering cylinders connected in parallel; and
     (2) first and second reciprocating pistons arranged in said first and second cylinders, respectively, said first piston subdividing said first cylinder into working and addition volumes, respectively, and said second piston subdividing said second cylinder into working and reduction volumes, respectively, said addition and reduction volumes of said cylinders being connected with said damping volume of said spring, said working volumes of said cylinders being operable to independently displace said pistons to transfer the defined volume of fluid between said pistons and said spring; and
   (c) sensor means connected with said metering means for sensing the condition of said metering means as a function of the relative position of said spring.

4. A hydropneumatic suspension system as defined in claim 3, wherein said pistons reciprocate between two limit positions within each cylinder, respectively, and further wherein said working volume of each of said cylinders is connected with a hydraulic system of the vehicle.

5. A hydropneumatic suspension system as defined in claim 3, wherein said sensors indicate when said pistons reach one of said limit positions.

6. A hydropneumatic suspension system as defined in claim 4, and further comprising a three-way valve connected between said metering means and said hydraulic system to control the operation of said working volumes of said cylinders.

7. A hydropneumatic suspension system as defined in claim 6, and further comprising a shut-off valve arranged between said three-way valve and each of said metering cylinders.

8. A hydropneumatic suspension system as defined in claim 4, wherein said metering cylinders are arranged in parallel juxtaposed relation within a metering unit including head portions for closing both ends of said cylinders, one head portion including a connection affording communication between said cylinder working volumes and said vehicle hydraulic system, the other head portion including a connection affording communication between said addition and reduction volumes of said cylinders and said damping volume of said spring.

9. A hydropneumatic suspension system as defined in claim 4, wherein said metering cylinders are aligned and include a common center plate and terminal end plates, said center plate affording communication between said addition and reduction volumes of said cylinders and said damping volume of said spring, said end plates affording communication between said working volumes of said cylinders and said vehicle hydraulic system.

10. A hydropneumatic suspension system as defined in claim 8, and further comprising a shut-off valve connected with said head portions.

11. A hydropneumatic suspension system as defined in claim 9, and further comprising a shut-off valve connected with said end plates.

12. A hydropneumatic suspension system as defined in claim 7, wherein said shut-off valves comprise seat valves.

13. A hydropneumatic suspension system as defined in claim 7, and further comprising
   (a) a control mechanism connected with said three-way valve and said shut-off valves for adjusting said spring with respect to a reference static position; and
   (b) a control lever for actuating said three-way valve to displace the vehicle frame from the static position relative to the axle.

14. A hydropneumatic system as defined in claim 3, wherein the vehicle comprises an armored vehicle, said at least one spring being arranged exterior of said vehicle and said metering means being arranged internally of said vehicle.

15. A hydropneumatic system as defined in claim 3, wherein the vehicle comprises a plurality of axles each having right and left end portions, each axle end portion having a separate independently operable metering cylinder and hydropneumatic spring, respectively.

* * * * *